Feb. 10, 1953   E. H. WITTENBERG   2,627,997
SAFETY LOCK FOR PRESSURE COOKERS
Filed Nov. 2, 1948
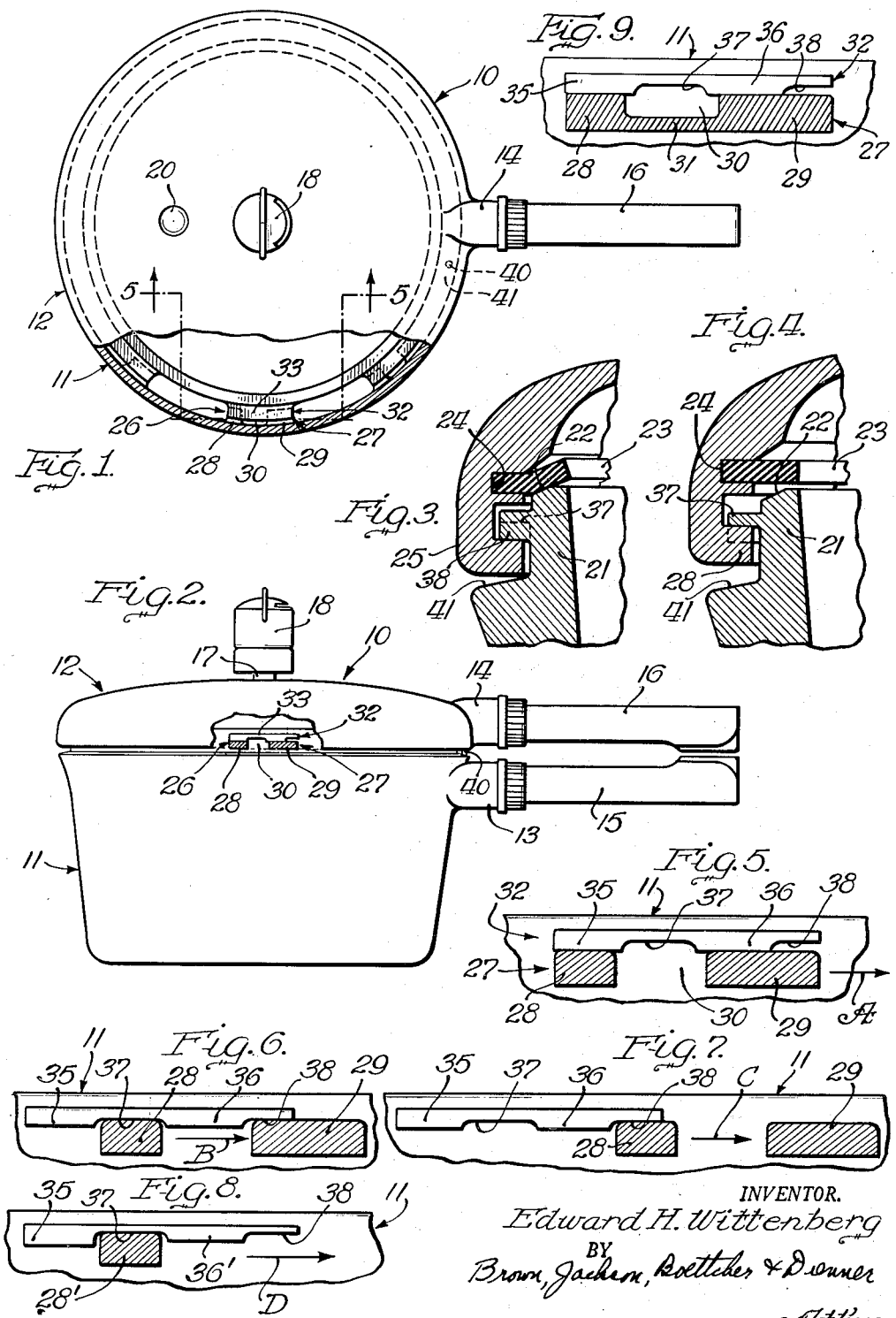
INVENTOR.
Edward H. Wittenberg
BY
Brown, Jackson, Boettcher & Dienner
Attys.

Patented Feb. 10, 1953

2,627,997

UNITED STATES PATENT OFFICE 2,627,997

SAFETY LOCK FOR PRESSURE COOKERS

Edward H. Wittenberg, Eau Claire, Wis., assignor to National Pressure Cooker Company, Eau Claire, Wis., a corporation of Wisconsin Application November 2, 1948, Serial No. 57,958

2 Claims. (Cl. 220—40)

My invention pertains to safety locking means and, more particularly, to safety locking means for interlocking the cover and body members of a vessel adapted to cook foods under pressure.

Such a vessel, generally referred to as a pressure cooker, is adapted to cook foods more rapidly than would be possible in a cooking vessel having no cover or in a covered vessel which is open to atmospheric pressure. The presence of pressure within a pressure cooker permits, without injury to the food, higher cooking temperatures than are possible in the ordinary type of cooking vessel. However, the presence of pressure in excess of atmospheric pressure within the pressure cooker requires that the cover be securely connected to the body of the vessel so that the cover will not be blown off as pressure builds up. Various forms of means for locking the cover to the body of the vessel have been proposed, some of which are adapted to render effective a sealing gasket or other sealing means disposed between the cover and the body. In this connection reference may be made to my Patent No. 2,218,188 dated October 15, 1940.

Reference to Wittenberg Patent No. 2,218,188 will show that the interlocking means includes radially extending lugs on the cover and body members of the vessel, which lugs are adapted to interengage to seal the members in fluid tight relation with respect to each other while securely locking them together. The locking strength provided by the lugs illustrated in the patented structure will be considerably in excess of that required to retain the cover in place when said lugs are fully engaged. However, the cooker may become sealed without the interlocking lugs being fully engaged and, in such event, if only a small portion of the interlocking area is engaged, pressure within the vessel may create a lifting force which will overcome the partial locking strength and blow off the cover. Instances such as the foregoing may occur, for example, when an operator, after opening a pressure cooker, has set the cover back on the hot cooker body for the purpose of keeping the contents warm but with no intention of sealing the cooker. At such time the locking lugs may inadvertently become slightly engaged by unintentional rotation of the cover with respect to the body or by reason of movement due to vibration or the like sufficient to interengage the lugs. Then the cooker may become sealed and pressure may build up to a point which may overcome the fractional locking strength and the cover may be blown from the body.

It is also possible through careless use of the pressure cooker to disengage the fully interlocked lugs of the patented structure after cooking pressures have been built up therein, whereupon the cover tends to be suddenly released by reason of internal pressure in the vessel. Since a pressure cooker may be employed by persons of varying skills and understanding, it is desirable to have the interlocking means simple and easy to use, but also safe against careless employment of the cooker. It is a primary object of my invention to provide safety interlocking means for securing the cover and body members of a pressure cooker together, which interlocking means tends to prevent engagement of the cover with the cooker in pressure tight relationship until after adequate and intended interlocking of the lugs has been occasioned. In such structure interlocking means is provided without a fluid-tight seal until adequate mechanical interlocking of the lugs has taken place, at which time the adjacent surfaces of the cover and body members, or a sealing element or gasket if such is employed between said surfaces, are brought into fluid tight relationship to permit the intended rise of internal pressure within said cooker.

The safety interlocking means of my invention is also adapted to prevent disengagement of the interlocking means until such time as substantially all pressure in excess of atmospheric pressure has been released from the vessel or the pressure has been reduced to a safe amount. This broad concept is new with applicant. Such construction will prevent the operator from accidentally or intentionally forcing the cover loose from the body member of the vessel when pressure in excess of atmospheric pressure exists within the cooker. This positively prevents accidents which might otherwise result from the cover blowing upwardly or from heated food being discharged in an explosive manner from the vessel when the cover is suddenly removed while substantial pressure exists within the vessel. To this end I provide a detent means associated with a recessed portion of the interlocking lug on one of said members, which detent serves to prevent disengagement of the cover from the body until the pressure in excess of atmospheric pressure within the vessel has been substantially completely released. The detent means, however, provides no barrier when the user is securing the cover to the vessel for purposes of cooking food therein.

In the preferred form of my invention the safety interlocking means comprises a plurality of cooperatnig pairs of interengageable surfaces on the cover and body members, said pairs being disposed substantially equal distances from each other about the circumferences of the members, with one surface of each pair being on the cover and the other surface of the pair being on the body of the cooker. The interengageable surfaces include projecting portions and recessed, or relief, portions which are adapted to interengage in a plurality of positions intermediate the completely disengaged position and the fully engaged positions of the safety interlocking means. When, for example, the cover is being secured to the body, a first position of the interengageable surfaces permits a projecting portion to interlock with a recessed portion on the other member in such fashion that the cover may be axially separable from the body only a slight amount sufficient to permit internal pressure to push up the lid and thereby become released instead of building up within the vessel. The axial separation is preferably limited to an amount which is sufficient easily to break any seal that may have been formed and to permit pressure to escape past the seal. In this position the interlocking areas of the interengageable surfaces, such as lugs, provide ample strength to hold the cover and body members in loose assembly. Further rotation of the cover with respect to the body provides an intermediate position, or positions, between the first position just described and the fully engaged position and includes movement past a detent formed on one of the interengaging surfaces intermediate its recessed end. Since, when the cover is being secured upon the body, internal pressure cannot build up within the vessel, the user has no difficulty in passing said recessed portion and beyond its detent to the fully engaged position of the interengageable surfaces at which point a fluid tight seal is provided between the cover and body members. In the fully interlocked position the interengaging surfaces are more than adequate to hold the cover and body together even for pressures in excess of normal operating pressures. Although it is customary to provide a pressure release mechanism for dangerously excessive pressures which might accidentally occur for some reason, nevertheless for all operating pressures and for pressures in excess thereof the interengaging surfaces provided on the cover and body members will safely and satisfactorily retain the cover and body together.

After the cooking operation has been performed and, assuming the existence of internal pressure within the vessel, if the user accidentally or intentionally tries to separate the cover from the body by relative rotation between said members before the internal pressure is dissipated, the interengaging surfaces will assume a position wherein the projecting portions of one member seat within the recessed portions on the other member and thereby permit sufficient axial separation of the cover and body to permit the seal to be broken and pressure to escape. In this position the detent means referred to above positively prevents further relative rotation of the members toward unlocked position until the pressure within the vessel has subsided. Thereafter the operator will be able to rotate the cover member relative to the body member past the detent to a position wherein a projecting surface and recessed surface are interlocked, but with the seal being ineffective, and then to a position wherein the cover and body members are completely separated. It is desirable to provide the next-to-the last position referred to, namely, beyond the detent but not complete separation, since it could be possible through misuse or careless use of the cooker to leave the interengaging surfaces in an intermediate position wherein the detent which is intended to be passed over is left seated against a projecting portion on the other member. Pressure might build up to some extent within the cooker under such condition, but even then there would be no danger to the user since, upon further relative rotation of the members to disengaged position there would be this position in which a projecting portion of one surface would seat in the recessed portion of the other interengageable surface with consequent release of pressure by slight axial separation of the cover and member before the interengageable surfaces could reach completely disengaged position. From the foregoing it will be apparent that regardless of the careless manner in which the pressure cooker embodying my invention may be employed, the user is protected against blowing off of the cover or the discharge from the vessel of the heated food.

In the preferred form of my invention, I provide stop means and indicating means whereby the user will be fully aware of the fully engaged, or interlocked, position of the safety interlocking means. The indicating means may conveniently be the handles which are secured to the cover and body members, alignment of said handles with each other not only providing an easy means for manipulating the pressure cooker but also indicating that the safety interlocking means is fully engaged. By providing both a stop means and indicating means in the pressure cooker, both a tactile and a visual indication is given to the user for judging of the fully interengaged position of the safety interlocking means.

Other objects, uses and advantages of the invention will become apparent, or be obvious, from the following detailed description when taken with the accompanying drawing in which:

Figure 1 is a top plan view of a pressure cooker embodying a preferred form of my invention, part of the cooker being broken away to show the safety interlocking means in fully interengaged position for securing the cover and body members together;

Figure 2 is a side elevational view of the pressure cooker of Figure 1, a portion of the cover being broken away to show the interlocking means in fully interengaged position;

Figure 3 is a fragmentary sectional view showing the inter-relation of the elements of the safety interlocking means and pressure sealing means when the cover of the pressure cooker is in a position corresponding to that of Figures 1 and 2;

Figure 4 is a view similar to Figure 3 but showing the inter-relation of the elements of the safety interlocking means and pressure sealing means when the cover is mechanically interlocked to the body with the seal broken;

Figure 5 is an enlarged fragmentary view substantially on the line 5—5 of Figure 1 and looking in the direction of the arrows;

Figure 6 is a fragmentary view similar to that of Figure 5 but showing the relative position of the interengageable surfaces of the safety interlocking means corresponding to the position shown in Figure 4;

Figure 7 is an enlarged fragmentary view similar to that of Figures 5 and 6 but showing the relationship of the elements of the interlocking means in a different position;

Figure 8 is a view similar to that of Figure 6 but showing a modification in the interengaging surfaces of the safety interlocking means. The same reference numerals are employed in the several views to indicate the same or similar elements; and Figure 9 shows a modification of one of the interlocking structures illustrated in Figure 5.

Referring first to Figures 1 and 2 of the drawings there will be seen a pressure cooker of a size suitable for domestic use, the cooker being designated generally by the reference numeral 10. The cooker 10 has a food receiving body member 11 conforming generally in shape to that of the ordinary sauce pan. A cover 12 is adapted to fit on and close the body member 11 in pressure tight relationship, as will be described in greater detail hereinafter. A pair of hollow handle receiving extensions 13 and 14 are integrally formed on the body member 11 and cover member 12, respectively. In the hollow extensions 13 and 14 are secured handles 15 and 16 and the cooker 10 is so designed that when the cover 12 is in fully closed, or interlocked, position on the body member 11 (that is, when the safety interlocking means to be described below is fully interengaged) the handle 16 will be aligned in super-imposed relationship over the handle 15 of the body member 11, as shown in Figures 1 and 2. The cover 12 is provided with a tubular post or vent pipe 17 upon which an indicator weight 18 is adapted to be positioned when the cooker 10 is in use. A safety pressure release plug 20 is provided in the cover 12 to permit the release of dangerously excessive pressures which might accidentally develop within the cooker 10.

Referring more particularly now to Figures 3 through 7 of the drawing, the details of the safety interlocking means of my invention will be described. The mouth of the body member 11 is wide and circular in shape and, when the cover member 12 is removed, provides easy access to the inside of said body member. Although it will be understood that the mouth may take different forms with respect to details, the illustrated form shows an upstanding flange 21 integrally formed around the top of the body member 11. On the top of the flange 21 there is provided at the outer circumference a beveled surface 22 which provides a sealing surface for cooperation with a gasket 23 which is carried in the cover member 12 in a rectangular groove 24. Groove 24 is located in a depending, or downwardly extending, skirt 25 of the cover 12 and opens toward the interior of said cover. The gasket or sealing means 23 may be made of any suitable heat and moisture-resistant, flexible material such, for example, as "neoprene."

When the cover 12 is in the position shown in Figures 1 and 2 relative to the body member 11, the sealing means, or gasket, 23 at its free, or inwardly projecting, portion will be applied with such force to the beveled seat 22 on flange 21 as to render the seal effective and fluid tight between the cover and body members. In such relative position of the cover and body members it will be seen that the free, or inwardly projecting, portion of the gasket 23 will present a greater surface area on its upper surface than on its lower surface whereby pressure within the cooker will act to further compress the gasket upon the seat 22.

The safety interlocking means for securing the cover and body members together comprises pairs of cooperating, interengageable elements such as the pair indicated by the reference numeral 26 in Figures 1 and 2. In the preferred form of the invention and considering now for purposes of description only one pair of interengageable surfaces, the interengageable surface 27 on the cover member 12 comprises a pair of spaced lugs 28 and 29 having a relief area 30 separating said lugs. It will be appreciated that although the lugs 28 and 29 are shown as being interconnected only by the vertically extending skirt 25 of the cover 12 they might also be interconnected by an intermediate horizontal wall or web, such as that shown by the reference numeral 31 of Figure 9. The relief area, or recess, 30 would then lie vertically above such wall or web 31. In the preferred form of the invention, however, I prefer to have the lugs 28 and 29 connected only by the vertically extending skirt, since they are more easily manufactured in that form.

The interengageable surface formed on the body member 11 of the cooker 10 is indicated by the reference numeral 32 and comprises a single radially extending lug 33 having pairs of projecting portions 35 and 36 and recessed portions 37 and 38, with the projecting and recessed portions alternating. Projection 35 and projection 36 may sometimes hereinafter be referred to, respectively, as a lug and a detent. Hereinafter, the lugs 28 and 29 formed on the cover member 12 may also be referred to from time to time as "projecting portions," since they extend upwardly with respect to the relief area 30 or any web or wall 31 which might be employed to join the lugs.

As has been pointed out above, when the pairs of interengageable surfaces, such as the pair 26, are in the position illustrated in Figures 1, 2, 3 and 5 the sealing means or gasket 23 is rendered effective and pressure may be built up within the cooker 10. In this position the lugs, or projecting portions 28 and 29 of the cover 12 are fully interengaged with the projecting portions 35 and 36 of the interengageable member 32 in the form of lug 33. It will be appreciated from a consideration of the various figures of the drawing, and particularly Figure 8, that the single lug 28 could be employed in lieu of the two lugs 28 and 29. However, in the preferred form of the invention I prefer to employ the two lugs 28 and 29 since they provide greater amounts of further interlocking and interengaging area and additional strength to the safety interlocking means. It will also be understood that the interengageable surfaces 27 and 32 could be reversed in their positions so that they would be located upon the body member and cover member, respectively, if desired. Furthermore, the particular shape of the projecting portions and recessed, or relief, portions might be varied without departing from the scope of the invention.

Assuming now that pressure has already been built up within the cooker 10 and that the user now wishes to open the cooker to withdraw the contents, it is proper first to let the cooker cool, either in air or by subjecting it to other cooling medium such as water, so that the pressure within the cooker may be quickly caused to subside. At this time the indicator weight 18 may be removed from the tubular vent pipe 17. When pressure has subsided within the pressure cooker, the cover 12 may be released from the body 11 by gripping the handles 15 and 16 in separate hands and rotating them relative to each other so that the lugs 28 and 29 of the cover member 12 move in the direction of the arrow A of Figure 5 relative to the projecting portions 35 and 36 of the interengageable member 32 on the body 11. If pressure continues to exist within the cooker 10, then as soon as the lugs 28 and 29 come to the recessed portions 37 and 38 of lug 33 the pressure will push the cover vertically upwardly, that is, in a direction along the longitudinal axes of the cover and body members (see Figure 6). This upward, or axial, movement permitted by the recessed portions 37 and 38 permits the seal to be broken so that pressure may escape. Until such time as the pressure within the vessel has subsided to substantially atmospheric pressure, the user will be unable further to rotate the cover and body members relative to each other toward disengaged position since the projecting portion 36 of lug 33 lies in the relief, or recessed, area between lugs 28 and 29 and thereby provides a detent which prevents further separation by rotation of the lugs 28 and 29 in the direction of the arrow B of Fig. 6. However, if, when the user began to rotate the cover and body members relative to each other from the position shown in Figure 5, pressure had already subsided substantially to atmospheric pressure within the cooker, then the lugs 28 and 29 would not be forced into the recessed portions 37 and 38 by pressure but only by such action as the resilient gasket 23 might provide. Such action of the gasket, however, would not prevent the cover from continuing to be rotated in the direction of the arrow B of Figure 6 since the gasket would be easily compressed as the cover is further turned in the direction of arrow B beyond the detent 36. From Figures 5, 6 and 7 it can be readily seen that the relief area between the lugs 28 and 29 must be of substantially the same width as, or of greater width than, the width of the projecting portion 36 on lug 33 in order for the detent to serve effectively. However, it is not necessary that the detent or projecting portion 36 have the width illustrated since it could be very much reduced in width, whether or not the relief area 30 between the lugs 28 and 29 were correspondingly reduced. However, having the projecting portion, or detent, 36 of the width shown provides additional interlocking area between the interengaging surfaces 27 and 32 of the cover and body members, respectively, in the fully interlocked position of the safety interlocking means.

Although the user, when rotating the cover and body members relative to each other to cause disengagement thereof, will normally complete the motion without interruption, since the user will permit all pressure to subside before separating the members, it would be possible for the user to rotate the cover and body members to such an extent only that the lug 28 might come to rest upon the projecting portion or detent 36 and be left there while the cooker is positioned above a source of heat. With the interengageable surfaces of the cover and body members in such position, pressure might be built up within the cooker if the sealing means forms a seal. To guard against such misuse, and the dangers which might result from thereafter rotating the members relative to each other toward fully disengaged position, I provide the recessed portion 38 to the side of the projecting portion or detent 36 so that before lug 28 becomes completely disengaged from lug 33 it still remains in interlocked position with respect to the recessed portion 38 to permit any pressure within the cooker to direct the cover upwardly a slight amount in an axial direction to permit the seal to be broken and pressure to be released. This position is shown in Figure 7 and provides an additional safety position before the lug 28 further passes in the direction indicated by the arrow C of Figure 7 to fully disengaged position. By this means, even careless use of the cooker will not result in damage to it or danger to the user.

Although the surface of the detent, or projecting portion, 36 is shown as lying in substantially the same plane as the projecting portion 35 in Figures 1 through 7, it will be appreciated that it might itself be recessed to some extent relative to the projecting portion 35 while yet not being recessed to the extent of recesses 37 and 38. Such a modification is shown in Figure 8 wherein a single lug 28' is employed and wherein the relative positions of the recessed portions and projecting portions is such that while the detent 36' will prevent rotation of the cover relative to the body member in the direction of arrow D of Figure 8 while pressure exists within the cooker, the detent 36' does not project sufficiently toward the lug 28' that when said lug is passing thereover any sealing of the gasket 23 will result. In other words, the portions 36', 37 and 38 are all sufficiently recessed to prevent sealing of the gasket 23 by engagement of any of said portions with the lug 28'. Nevertheless the detent 36' will extend toward and alongside the right edge of lug 28' (corresponding to the relief area 30 of Figures 1 through 7) sufficiently to prevent rotation of lug 28' in the direction of the arrow D of Figure 8 when pressure substantially above atmospheric pressure exists in the cooker.

Referring again to Figures 5, 6 and 7 it will be seen that, when the user is preparing to employ the pressure cooker and places the cover 12 on the body 11 while gripping the handles 15 and 16 one in each hand, the leading projecting portion, or lug, 28 will upon rotation toward locking position first come into interlocking engagement with the recessed portion 38 of the lug 33 (see Figure 7), the lugs 28 and 29 then moving in the direction opposite to that of arrow C. Further rotation in the opposite direction from that of arrow C will bring the lugs 28 and 29 into the position shown in Figure 6 as soon as the lug 28 has passed over the detent 36. Still further rotation in the same direction will cause the lugs 28 and 29 to come into the position shown in Figure 5 relative to the projecting portions 35 and 36 on lug 33. At this time a pin 40 (see Figure 1) projecting upwardly, for example, from the shoulder 41 of the body member 11 will be abutted against by a lug, such as lug 29 on the cover 12. By this abutting action the user can determine that the interlocking means is fully interengaged. Also, at this time, the handles 15 and 16 are aligned in superimposed position so that a visual indication is also given of the safety interlocking means being fully interengaged and the sealing gasket being rendered effective so that pressure may be built up within the cooker.

If, when the cover 12 is first placed upon the body portion 11 without relative rotation of said members toward interlocking position, the user places the cooker above a source of heat and the cover is accidentally caused to rotate relative to the body member so that the lug 28 comes under the recessed portion 38, no danger will result from blowing off of the cover since any pressure which may develop within the cooker will promptly direct the cover axially upwardly within the limits determined by the lug 28 and the recessed portion 38 to permit any seal to be broken and pressure to be released. From this it will appear that in both the locking and unlocking operations of the cover relative to the body, carelessness of the user will be guarded against so that neither the user nor the cooker will become damaged.

Although I have illustrated a preferred embodiment of my invention, various changes or modifications coming within the scope of the invention will be suggested to others by reason of my disclosure and I do not, therefore, intend to be limited to the illustrated embodiments, except insofar as the appended claims are so limited.

I claim:

1. In a pressure cooker, a body member and a cover member therefor; cooperating sealing surfaces carried by said members; and interlocking means carried by said members; said interlocking means in one position securing the members together against axial separation and in pressure-tight sealing relation for cooking operations, and in a second position securing the members together against rotation to completely disengaged position, but permitting limited axial separation of the members, when it is attempted to completely disengage said members by relative rotation of them while pressure exists within the cooker; said interlocking means comprising a plurality of pairs of cooperating interengageable structures disposed in spaced circumferential relationship on said members, one of the structures of each pair of structures being on one of said members and comprising a pair of horizontally spaced lugs having horizontal bearing surfaces, and the other of the structures of each pair being on the other member and comprising a lug having a horizontal bearing surface and a pair of recesses having flat horizontal surfaces with a detent between the recesses; the widths and spacing of said recesses and detent being such as to accommodate said pair of lugs in said recesses with the lugs astride said detent, the pair of lugs being adapted to move into said recesses and to engage their bearing surfaces with the flat surfaces of the recesses and permitting the cover member to thereby rise from said body member when said interlocking means are in said second position and pressure exists in the cooker, the detent then preventing rotation of said pair of lugs toward disengaged position of the cover and body members.

2. In a pressure cooker, a body member and a cover member therefor; cooperating sealing surfaces carried by said members; and interlocking means carried by said members; said interlocking means in one position securing the members together against axial separation and in pressure-tight sealing relation for cooking operations, and in a second position securing the members together against rotation to completely disengaged position, but permitting limited axial separation and non-sealing relationship between the members, when it is attempted to completely disengage said members by relative rotation of them while pressure exists within the cooker; said interlocking means comprising a plurality of pairs of cooperating interengageable structures disposed in spaced circumferential relationship on said members, one of the structures of each pair of structures being carried by a flange on the cover member and comprising a pair of horizontally spaced radially inwardly extending lugs having bearing surfaces in the same horizontal plane, and the other of the structures of each pair being carried on the body member and comprising a radially outwardly extending lug having a horizontal bearing surface and a pair of recesses having flat horizontal surfaces with a detent between the recesses; said detent having a horizontal bearing surface in the same horizontal plane as the bearing surface on its lug; the widths and spacing of said recesses and detent being such as to accommodate said pair of lugs in said recesses with the lugs astride said detent, the pair of lugs being adapted to move into said recesses to engage their horizontal bearing surfaces with the horizontal flat surfaces of the recesses and permitting the cover member to thereby rise from said body member when said interlocking means are in said second position and pressure exists in the cooker, the detent then preventing rotation of said pair of lugs toward disengaged position of the cover and body members; and the horizontal bearing surfaces of each pair of lugs engaging the horizontal bearing surfaces of the other lug and its detent when the interlocking means are in said first position for positioning said cover and body members in pressure-tight relation.

EDWARD H. WITTENBERG.

REFERENCES CITED

The following references are of record in the file of this patent:

UNITED STATES PATENTS

| Number | Name | Date |
|---|---|---|
| 1,887,700 | Stevens | Nov. 15, 1932 |
| 2,101,756 | Saunders et al. | Dec. 7, 1937 |
| 2,164,450 | Eshbaugh et al. | July 4, 1939 |
| 2,191,614 | Frantz | Feb. 27, 1940 |
| 2,195,132 | Nelson | Mar. 26, 1940 |
| 2,201,314 | Illsley | May 21, 1940 |
| 2,218,188 | Wittenberg | Oct. 15, 1940 |
| 2,225,448 | Hamilton | Dec. 17, 1940 |
| 2,513,458 | Dion | July 4, 1950 |
| 2,534,164 | Finch | Dec. 12, 1950 |
| 2,549,387 | Richeson | Apr. 17, 1951 |
| 2,559,728 | Morrison, Jr. | July 10, 1951 |

FOREIGN PATENTS

| Number | Country | Date |
|---|---|---|
| 588,021 | Great Britain | May 12, 1947 |